United States Patent [19]

Hall

[11] Patent Number: 5,395,902
[45] Date of Patent: Mar. 7, 1995

[54] DISPERSION COPOLYMERIZATION IN LIQUID ALIPHATIC HYDROCARBONS

[75] Inventor: James E. Hall, Mogadore, Ohio

[73] Assignee: Bridgestone Corporation, Tokyo, Japan

[21] Appl. No.: 282,184

[22] Filed: Jul. 28, 1994

Related U.S. Application Data

[63] Continuation-in-part of Ser. No. 754,492, Sep. 3, 1991, abandoned.

[51] Int. Cl.$^6$ ............................. C08F 2/14; C08F 4/48; C08F 236/10
[52] U.S. Cl. .................................... 526/201; 526/173; 526/340; 525/332.3; 525/332.9; 525/342
[58] Field of Search ................... 526/173, 201, 340; 525/332.9

[56] References Cited

U.S. PATENT DOCUMENTS

| | | | |
|---|---|---|---|
| 3,402,160 | 9/1968 | Hayes | 526/201 X |
| 4,098,980 | 7/1978 | Markle et al. | 526/201 |
| 4,452,960 | 6/1984 | Throckmorton | 526/201 |
| 4,942,209 | 7/1990 | Gunesin | 526/173 |
| 5,270,395 | 12/1993 | Gunesin et al. | 525/271 X |

*Primary Examiner*—Fred Teskin
*Attorney, Agent, or Firm*—Frank J. Troy, Sr.

[57] ABSTRACT

The present invention relates to a process for the dispersion copolymerization of 35 to 70% by weight of vinyl substituted aromatic monomer and 30 to 65% by weight of conjugated diene monomer comprising carrying out the copolymerization in a reaction mixture containing a liquid aliphatic hydrocarbon dispersing medium, an anionic catalyst system, and a block copolymer dispersing agent comprising at least two polymer blocks wherein at least one of the polymer blocks is soluble in the dispersing medium and at least another of the polymer blocks is insoluble in the dispersing medium and the dispersing agent acts to disperse a random copolymer of vinyl substituted aromatics and conjugated dienes formed in the presence of the dispersing agent.

13 Claims, No Drawings

5,395,902

DISPERSION COPOLYMERIZATION IN LIQUID ALIPHATIC HYDROCARBONS

This application is a continuation-in-part of presently pending patent application Ser. No. 07/754,492, filed on Sep. 3, 1991, now abandoned.

FIELD OF THE INVENTION

The present invention relates to a random styrene-butadiene type rubber polymerization process conducted in a nonaqueous dispersion utilizing butadiene and styrene type monomers, a dispersing agent and a catalyst system.

BACKGROUND OF THE INVENTION

In prior art nonaqueous dispersion polymerization systems, an organic medium is utilized having poor solvent properties for the polymer being produced. A dispersing agent is utilized in the organic medium in order to disperse the polymer being formed throughout the medium. These dispersing agents are generally polymeric materials such as block copolymers, random copolymers, or homopolymers as described in U.S. Pat. Nos. 4,098,980 and 4,452,960.

Styrene-butadiene rubbers (SBR) are elastomers and have generally been prepared in solvents in which SBR is soluble. Only SBR's having a styrene content of less than 35% are soluble in hexane or linear aliphatic solvents. SBR having a styrene content greater than 35% have been polymerized in aromatic or cycloaliphatic solvents via solution polymerization. These polymers are not completely insoluble in the linear alkane solvents, and in fact are highly swollen in these solvents. A process for the nonaqueous dispersion polymerization of styrene and butadiene monomers into a SBR having a styrene content greater than 35% would be highly desirable.

It is an object of the present invention to provide a dispersing agent and anionic initiation system to promote the random polymerization of styrene and butadiene monomers in a nonaqueous dispersion into SBR having 35 to 70% by weight of styrene.

Such a nonaqueous dispersion polymerization process offers many advantages over solution polymerization processes including improved heat transfer, energy savings, higher polymer concentrations in the reaction medium, increased production capacity, and very high molecular weight polymers can be produced.

SUMMARY OF THE INVENTION

In accordance with the present invention, a process is provided for the nonaqueous dispersion random polymerization of a mixture of 30 to 65% by weight of a conjugated diolefin monomer, preferably butadiene, and 35 to 70% by weight of a vinyl substituted aromatic monomer, preferably styrene, in a liquid aliphatic hydrocarbon dispersion medium with an anionic initiator catalyst system in the presence of a block copolymeric dispersing agent.

DETAILED DESCRIPTION OF THE INVENTION

The copolymer rubbers prepared by the process of the instant invention are random copolymers formed by the copolymerization of a conjugated diene monomer and a vinyl substituted aromatic monomer. Random copolymer is defined as a copolymer of a diene monomer and a vinyl aromatic monomer (VAM) in which no more than 5% of the copolymer is composed of VAM blocks of 10 or more VAM units. Preferably, no more than 5% of the VAM is contained in blocks of 10 or more VAM units. Most preferably, 100% of VAM units are in blocks of less than 10 VAM units and 80% of VAM units are in blocks of less than 5 VAM units. This definition applies to polymers having less than 50% by weight of styrene content. Somewhat higher levels can be tolerated at 50–70% styrene levels in SBR.

The conjugated diene monomers utilized in the synthesis of such copolymer rubbers generally contain from 4 to 12 carbon atoms. Diene monomers containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Vinyl substituted aromatic monomers suitable for use in preparing the random copolymers of this invention include any vinyl or alphamethyl vinyl aromatic compounds capable of being polymerized by an anionic initiator. Particularly useful monomers for this purpose are vinyl aryl and alphamethyl-vinyl aryl compounds such as styrene, alphamethyl styrene, vinyl toluene, vinyl naphthalene, alphamethylvinyl toluene, vinyl diphenyl, and corresponding compounds in which the aromatic nucleus may have other alkyl derivatives up to a total of 8 carbon atoms. Certain vinyl substituted aromatic monomers are not suitable for use in this invention as homopolymers of these monomers are soluble in linear alkane solvents such as hexane and their copolymers with diene are also soluble. A specific example of an unsuitable monomer type is t-butyl styrene.

The preferred comonomers for use in the process of the present invention are styrene and butadiene for production of a SBR product. In the production of the random copolymers of the present invention, the vinyl substituted aromatic monomer contributed content ranges from 35 to 70% by weight, preferably 40 to 60% by weight, and the diene monomer contributed content ranges from 30 to 65% by weight, preferably 40 to 60% by weight.

The copolymers produced by the process of the present invention can be prepared from any combination of the aforementioned conjugated diene and vinyl aromatic monomers. While the following discussion relates to the production of randomized styrene-butadiene rubbers (SBR) from styrene and butadiene monomers, it is apparent that this discussion encompasses the use of any of the above-identified vinyl-substituted aromatic hydrocarbons and conjugated dienes. These SBR type copolymers have an average molecular weight of 20,000–1,500,000 preferably 75,000–500,000 as determined by Gel Permeation Chromatography (GPC). In addition to the high molecular weight and good hot tensile strength, these copolymers have good oil acceptance or extendibility, modulus, tensile strength and stability against heat and aging. These copolymers are especially useful in the production of high performance tires.

The solvents, also known as the dispersing medium, used in the present polymerization process are linear and branched aliphatic hydrocarbons such as butane, pentane, hexane, heptane, isopentane, octane, isooctane, nonane, 3-methylpentane, 2-methylpentane, dimethylbutane, 2,2,3-triethylbutane and the like and mixtures thereof. Solvents are employed within such a range as being necessary to maintain a dispersion state in the solvent and for properly controlling stability of a polymer dispersion. The insolubility of SBR in a solvent is a function of molecular weight of the polymer, temperature, and the solubility parameter, which is the square root of the cohesive energy density, that is;

$$\text{solubility parameter (s.p.)} = \sqrt{\Delta E/V}$$

wherein E is internal energy and V is the molar volume. For polymers, it is often best to calculate s.p. as displayed in the article "A Method for Estimating the Solubility Parameters and Molar Volumes of Liquids" in Polymer Engineering & Science, vol. 14, no. 2, pp 147–154 (1974). The calculated s.p. is 8.6 for polybutadiene, 9.2 for SBR having a 35% styrene content, and 10.5 for polystyrene. The s.p. of n-hexane is 7.3 and a 35% styrene SBR has only partial solubility in n-hexane. The solubility parameter (s.p.) of SBR or other random copolymer produced by the present invention must be at least 1.9 greater than the s.p. of the solvent or dispersing medium, so that the SBR is not completely soluble in the dispersing medium and can thus form an acceptable dispersion. The aliphatic hydrocarbon is used as the solvent to disperse the mixture of copolymers into fine particles.

The preferred solvent for use in the present process is n-hexane. While the solvent preferably consists of 100% by weight of linear or branched aliphatic hydrocarbons or mixtures thereof; up to 25% by weight of the total solvent can be cyclic hydrocarbons, such as alicyclic hydrocarbons such as cyclopentane, methylcyclopentane, cyclohexane, methylcyclohexane and aromatic hydrocarbons such as benzene and toluene. It is thus necessary that the solvent contain at least 75% by weight of an aliphatic branched and/or linear hydrocarbons. It is preferable that the solvent contain at least 50% by weight of aliphatic linear hydrocarbons, most preferably at least 60%, with the remaining portion of the non-cyclic aliphatic hydrocarbon solvent being branched hydrocarbons. It is preferable that the dispersing medium solvent contain hydrocarbons having nine or less carbon atoms.

A higher percentage of VAM units in the SBR allows for a higher percentage of non-aliphatic hydrocarbons to be present in a solvent mixture. However, for a SBR with 40–45% styrene content, no more than 5% of the solvent should consist of a cyclic hydrocarbon such as cyclohexane, for example. The random copolymer product contains 10 to 50 weight percent solids relative to the liquid hydrocarbon dispersing medium to yield a fluid polymer dispersion that can be easily handled.

The copolymerization process of the present invention is performed in the above-discussed aliphatic hydrocarbon solvent in the presence of a dispersing agent and an anionic initiator catalyst system.

In the non-aqueous dispersion polymerization process of the present invention for polymerizing a conjugated diene and a vinyl aromatic monomer in a liquid aliphatic hydrocarbon dispersion medium with an anionic catalyst in the presence of a block copolymer dispersing agent, the block copolymer dispersing agent is selected from a variety of polymers containing at least two blocks linked by chemical valences wherein at least one of said blocks ("A" block) is soluble in the dispersion medium and at least another of said blocks ("B" block) is insoluble in the dispersion medium, and the dispersing agent acts to disperse polymers formed from conjugated dienes and vinyl aromatic monomers which are formed in the presence of the dispersing agent. The insoluble "B" block provides an anchor segment for attachment to the SBR polymer. The soluble "A" block of the dispersing agent provides a sheath around the otherwise insoluble copolymer and maintains the copolymeric product as numerous small discrete particles rather than an agglomerated or highly coalesced mass. The insoluble "B" block may, if desired, contain a plurality of pendent groups.

The soluble "A" block of the dispersing agent comprises about 10 to about 90 percent by weight of the total block copolymer. The insoluble "B" block of the dispersing agent comprises about 10 to about 90 percent by weight of the total copolymer. The dispersing agent preferably contains about 30 to about 70 percent by weight of the soluble "A" block and about 30 to about 70 percent by weight of the insoluble "B" block, from 45 to 55 weight percent of "A" and 45 to about 55 percent by weight of "B" being most preferred. The number average molecular weights Mn of each "A" block and each "B" block should be at least 11,000 and a maximum of 750,000, preferably 25,000 Mn to 125,000 Mn and most preferably 40,000 Mn to 75,000 Mn.

While it is believed that the soluble "A" can be prepared from any monomer providing a soluble block, it is preferred that the soluble "A" block be selected from a polymer formed by polymerization of conjugated diene monomers or be selected from a copolymer formed by copolymerization of conjugated diene monomers and vinyl substituted aromatic monomers. The soluble "A" block is most preferably selected from a polymer or a copolymer formed from 70 to 100 parts by weight of conjugated diene monomer contributed units and 0 to 30 parts by weight of vinyl substituted aromatic monomer contributed units with all polymer or copolymer blocks being soluble in the liquid aliphatic hydrocarbon dispersion medium.

The insoluble "B" block is chosen for its ability to produce dispersions of the copolymers formed in the dispersion polymerization process. The insoluble "B" block is anchored to the surface of or the outer layer of the copolymer particle by physical adsorption processes, as for example, by van der Waals forces. Therefore, its main criteria for success as an anchor is to be relatively immiscible in the dispersing medium. While it is believed that the insoluble "B" block can be prepared from any monomers providing an insoluble block, it is preferred that the insoluble "B" block be selected from a polyvinylaromatic polymer or a copolymer formed by the copolymerization of conjugated diene monomers and vinyl substituted aromatic monomers. The insoluble "B" block is preferably selected from a polymer or copolymers formed from 0 to 65 parts by weight of conjugated diene monomer contributed units and 35 to 100 parts by weight of vinyl substituted aromatic monomer contributed units.

The preferred dispersing agents for use in the present process can be represented by the following structural formula:

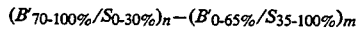

wherein B' represents butadiene monomer units and S represents styrene monomer units, all blocks of (B'/S) are randomized copolymers of butadiene and styrene monomers. The subscripts display the possible percentage of each monomer in the blocks and n and m are any positive integers preferably ranging from 1 to 8. When n and/or m is greater than 1 the monomer percentage can vary within the stated range for each copolymer block. Most preferred diene/vinyl aromatic block copolymers having (1) a first block (n=1) formed from polybutadiene or by the random copolymerization of styrene/butadiene to form an SBR block having less than 30% by weight of styrene contributed content, and (2) a second block (m=1) formed from a randomized copolymer of styrene/butadiene having a styrene contributed content comparable with the SBR copolymer to be made by the process of the present invention, namely in the range from 35% to 70% by weight of styrene and 30% to 65% by weight of butadiene.

The block copolymers for use as dispersing agents in the instant invention may be coupled by suitable coupling agents as are well known in the art and can be di-, tri-, or tetrafunctional. Exemplary coupling agents include but are not limited to alkane dichlorides of 1-10 carbon atoms, $CCl_4$, $SiCl_4$, and $(PNCl_2)_3$ and the like. The molecular weight ($M_n$) of the dispersing agents ranges between 2,000 and 1,500,000, preferably 50,000 to 150,000. The dispersing agents used in the preparation of the SBR copolymers are blended with the SBR copolymers upon their recovery. The dispersing agents are utilized in an amount ranging from about 1 to 20%, preferably 5-15%, and most preferably 8-12% by weight of the SBR precursor monomers and subsequently formed SBR copolymer. The dispersing agents of the present invention can be prepared by procedures as disclosed in U.S. Pat. No. 4,098,980 to Markle et al, which is herein incorporated by reference.

The catalyst systems are anionic initiators for use in preparing the SBR copolymers, preferably any organolithium catalyst which is known in the art as being useful in the polymerization of vinyl aromatic hydrocarbons and conjugated dienes. Suitable catalysts which initiate polymerization of the monomer system include organolithium catalysts which have the formula $R(Li)_x$ wherein R represents a hydrocarbyl radical of 1 to 20, preferably 2-8, carbon atoms per R group, and x is an integer of 1-4. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include: phenyllithium, naphthyllithium, 4-butylphenyllithium, p-tolyllithium, 4-phenylbutyllithium; 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicoxane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Mixtures of different lithium catalysts can also be employed, preferably containing one or more lithium compounds such as $R(Li)_x$. The preferred lithium catalyst for use in the present invention is n-butyllithium.

Other lithium catalysts which can be employed are lithium dialkyl amines, lithium dialkyl phosphines, lithium alkyl aryl phosphines and lithium diaryl phosphines.

Anionic initiators are typically employed in amounts ranging from 0.2 millimoles to 100 millimoles of anionic initiator per hundred grams of monomer in the reaction vessel.

All amounts of anionic initiator are indicated by hundred grams of monomer or by ratio of components in the instant invention and are considered to be catalytically effective amounts, that is, effective amounts for initiating and conducting polymerization of the disclosed monomer systems to produce copolymers of the present invention.

A SBR copolymer randomizing agent such as an ether or an amine is preferably added to the SBR dispersion polymerization system as part of the catalyst system in an amount effective to promote random copolymerization of the styrene and butadiene monomers. Suitable randomizing agents are well known in the art such as sodium or potassium alkoxides. Randomizing agents are employed in the polymerization system in amounts generally ranging from a molar ratio of 1:100 to 1:2 of randomizing agent to anionic initiator.

Modifying agents such as ethers, tertiary amines, chelating ethers or amines, and sodium or potassium alkoxides or alkyls, may be added to increase the 1,2-addition reaction of the diene monomer in the SBR. Such modifying agents are well known in the art and may be employed in amounts generally ranging from 1:10 to 100:1 molar ratio of the modifier to anionic initiator. The 1,2-addition product can be increased from the 5–15% range to as high as 90% of the diene monomer units being incorporated into the SBR as 1,2-addition product.

The preferred 1,2-vinyl content of the SBR produced in accordance with the process of the instant invention ranges between 15 to 65% of the diene monomer contributed units. It is further preferred that the 1,2-vinyl content in the diene contributed units of the dispersing agents be within 15% of the desired final 1,2-vinyl content of the SBR being produced herein.

The reaction mixture utilized in the nonaqueous dispersion polymerization of butadiene and styrene to produce a random copolymer having a styrene content between 35 and 70 percent is comprised of a liquid nonaqueous dispersion medium, a dispersing agent, butadiene and styrene monomer, and catalyst system. Such a polymerization can be run over a temperature range from 0° up to 150° C. Most generally, it is preferred to utilize a reaction temperature from 40° C. to 110° C. The reaction time required in such a polymerization will vary with the reaction temperature, monomer concentration, catalyst system, and catalyst level. Generally, this reaction time will vary from about 20 minutes up to about 30 hours. Commonly, it will be preferred to utilize a reaction time from about 1 up to about 6 hours.

The amount of butadiene and styrene monomers that can be utilized in such a nonaqueous dispersion polymerization reaction mixture can be varied from about 10 to about 50 weight percent by weight based upon the total reaction mixture. It is preferred to have a final polymer concentration ranging from 20 to 35 percent by weight based upon the total reaction mixture.

It is desirable to conduct this polymerization in an oxygen and moisture free environment. For example, it is desirable to sparge the reaction mixture with dry nitrogen and to run the polymerization under a dry nitrogen atmosphere. The pressure in the reaction system during the polymerization generally will be a function of the polymerization temperature, the monomer concentration, and the boiling point of nonaqueous dispersion medium. The polymerization pressure will usually be maintained within the range between 1.0 and 15 atmospheres.

The nonaqueous dispersion polymerization can be run in a batch process by simply adding the initiator components to a nonaqueous dispersion medium containing butadiene and styrene monomers and a polymeric dispersing agent to form the reaction mixture. In a semi-batch process, the monomers are metered into the reactor containing the dispersion medium and an anionic initiator. The polymer dispersing agent can either be metered into the reactor with the monomers or added to the reactor before the monomers are added. In a continuous polymerization process, all components are added simultaneously. During the course of the polymerization it will generally be desirable to provide some form of agitation to the reaction mixture, such as stirring, shaking, or tumbling. A short stopping agent such as an alcohol may be employed to terminate the polymerization after the desired reaction time or at the desired percent conversion of monomers to copolymer. In general the conversion of monomers into polymers is allowed to proceed to about completion. An appropriate antioxidant can be added at this stage of the process.

The nonaqueous dispersions formed in this polymerization process have concentrations of SBR ranging between about 10 and 50 weight percent and are quite fluid. This fluidity permits greatly improved heat transfer as compared to the fluidity of solutions of SBR copolymers prepared using solution polymerization techniques. Due to the relative fluidity of these nonaqueous dispersions, the concentration of dispersed SBR copolymers in the medium can be increased by 25 to 100% or more over the maximum allowable concentrations in solution polymerization techniques.

The elastomeric SBR copolymer can be recovered from the hydrocarbon solvent by steam desolventization or by drum drying techniques thus providing energy savings due to higher solids levels. By proper control of particle size, the polymers can be recovered by filtration or centrifugation techniques.

The recovered copolymer products, depending on their molecular weights and compositions, can be used for a variety of goods such as tires and various rubber molded products.

It is believed that dispersed polymer particles produced in accordance with the process of the present invention contain a certain fraction of solvent and are swollen micelles. This physical characteristic is totally unlike polystyrene dispersions in hexane or SBR in water emulsions that are completely insoluble. It is remarkable that these solvent swollen micelles form stable dispersions.

It is believed that one skilled in the art can, using the preceding description, utilize the present invention to its fullest extent. The following preferred specific embodiments are, therefore, to be construed as merely illustrative of the catalyst system and the polymerization process of the present invention. All percentages identified in the examples are by weight unless otherwise indicated.

EXAMPLES 1–4

The following batch polymerization reactions displayed in Table 1 utilized varying dispersing agent percentages. The dispersing agent used in these examples was a 50/50 by weight diblock copolymer containing a first hexane soluble block of 10% by weight of styrene and 90% by weight of 1,3-butadiene. The first block of the dispersing agent was prepared by polymerizing the cited weight ratio of monomers using a n-butyllithium initiator and a potassium-t-amylate randomizing agent in a 30/1 molar ratio in hexane for two hours at 70° C. After formation of the first random block copolymer, a second block was formed by a subsequent charge of 45% by weight of styrene monomer and 55% by weight of 1,3-butadiene monomer which was added to the reaction mix and polymerized for two hours at 70° C. Polymerization was terminated by the addition of methanol to the reaction to yield one lb. of a diblock copolymer dispersing agent as 10% solids in hexane.

Solutions of 55% by weight of 1,3-butadiene and 45% by weight of styrene in hexane were charged into a series of 28 oz. crown-capped bottles. These solutions were sparged with dry nitrogen.

Various percentages by weight of the diblock copolymer dispersing agent were added to these solutions in amounts shown in Examples 1 to 4 in Table I. Catalyst concentrations in the amount of 1.0 mmole parts per hundred monomer (phm) of n-butyllithium as the anionic initiator and 0.2 mmole phm of Na-t-amylate as the styrene randomizer were added in situ. The mixtures were polymerized at 50° for 3 hours. Very good or good dispersions were prepared by using 5% by weight or more of the dispersing agent.

TABLE I

| EXAMPLE NO. | WT. % DISPERSING AGENT | WT. % STYRENE IN SBR | DISPERSION % SOLIDS | DISPERSION APPEARANCE |
|---|---|---|---|---|
| 1 | 0 | 45 | 16 | Phase Separation |
| 2 | 5 | 44 | 15 | Good |
| 3 | 9 | 44 | 15 | Good |
| 4 | 13 | 43 | 14 | Very Good |

EXAMPLES 5 AND 6

A dispersing agent made in accordance with the procedure described in Examples 1 to 4 was prepared. The dispersing agent in the amount identified in Table II was added to a 10 gallon reactor as a 15% solution in hexane and hexane solutions of styrene and 1,3-butadiene were added in a 45/55 ratio of styrene to 1,3-butadiene using a semi-batch technique as described in U.S. Pat. No. 3,094,512. The polymerization was conducted in the presence of 1.0 mmol phm of n-butyllithium at 95° C. for three hours. Excellent dispersions stable for several weeks were obtained in the products of Examples 5 and 6. The $M_w/M_n$ of the product of Example 5 was 1.20 and in Example 6 was 1.26 with a glass transition temperature of −30° C. 6.5 lb. of polymer product was recovered in Example 5 and 11.5 lb. of polymer was recovered in Example 6.

TABLE II

| EXAMPLE NO. | WT. % DISPERSING AGENT | DISPERSION % SOLIDS | WT. % STYRENE IN SBR | $M_n$ |
|---|---|---|---|---|
| 5 | 10 | 15 | 41 | 127,000 |
| 6 | 10 | 27 | 46 | 109,000 |

EXAMPLES 7–11

A-B diblock dispersants were prepared by polymerizing 1,3-butadiene in hexane in the presence of n-BuLi to produce the A block. Then a blend of 50% by weight of styrene and 50% by weight of 1,3-butadiene was added to the A block solution together with a Na-t-amylate randomizing agent in a 1/5 ratio to n-BuLi. Polymerization of the B block was conducted at 50° C. and the resultant A-B dispersants displayed properties displayed in Table III.

Properties of dispersion SBR prepared in accordance with the procedures of Examples 5–6 utilizing these dispersants are displayed in Table III. Good dispersions were formed in all examples with each dispersion having a solids content ranging from 21 to 23%.

TABLE III

| | Example No. | | | | |
|---|---|---|---|---|---|
| | 7 | 8 | 9 | 10 | 11 |
| AB Dispersing Agent | | | | | |
| % Styrene (Hnmr) | 43 | 35 | 28 | 20 | 12 |
| $M_n$ (GPC) | 98,100 | 91,100 | 93,100 | 102,300 | 102,100 |
| A/B Ratio | 1/6.2 | 1/2.5 | 1/1.3 | 1.5/1 | 3.4/1 |
| SBR | | | | | |
| % Vinyl | 19.7 | 21.3 | 18.3 | 23.7 | 23.9 |
| % Styrene | 43.8 | 44.4 | 43.2 | 43.6 | 43.3 |
| $M_n$ (GPC) | 173,300 | 148,000 | 155,200 | 159,300 | 162,300 |

EXAMPLE 12

An A-B diblock dispersant was prepared in one step by the addition of a 4.6/1 ratio of n-BuLi/K-t-amylate in a hexane solution of 40% styrene/60% 1,3-butadiene. Polymerization was conducted at 50°, to produce a diblock dispersant having a first block having a high styrene content tapering into a second block having a low styrene content. The A-B dispersant was utilized to prepare a SBR utilizing the semibatch technique in Example 5 in a one gallon reactor. The dispersion was excellent having a 19% solids content. The resultant SBR contained 44.5% styrene and displayed $M_n = 136,000$ and $T_g = -45°$ C.

EXAMPLES 13–15

An A-B diblock dispersant was prepared with the A block consisting of a polybutadiene having 70% vinyl content and a B block consisting of a SBR having 50% styrene content, 65% vinyl content in the butadiene contributed units and $M_n = 113,500$.

This A-B diblock dispersant was utilized to produce high vinyl SBR using a multilithio initiator and an ether based modifier in the semibatch process as described in Example 5 as displayed in Example 13 to 15. The SBR polymers of Examples 14 and 15 were further coupled with SiCl₄. High molecular weight polymers were produced as free-flowing dispersions at high solids in a commercial hexane solvent. The properties of the SBR for each example are displayed in Table IV.

EXAMPLE 16

An A-B diblock dispersant was prepared as in Example 13 and was used in the semibatch process as recited in Example 5. The properties of the SBR produced in accordance with this process are displayed in Table IV.

TABLE IV

| Example No. | 13 | 14 | 15 | 16 |
|---|---|---|---|---|
| % Vinyl | 56.7 | 54.5 | 58.3 | 30.1 |
| % Styrene | 51.6 | 51.2 | 54.0 | 37.4 |
| $T_g$ (°C.) | −6 | −4 | −9 | −43 |
| % Solids in Dispersion | 23.7 | 24.6 | 23.4 | 22.4 |
| $M_n$ | 378,000 | 440,000 | 346,000 | 128,900 |
| $M_w$ | 1,360,000 | 1,965,000 | 1,566,000 | 169,600 |

EXAMPLE 17

An A-B diblock copolymer dispersing agent was prepared as follows. A 28 oz. bottle was charged with 126.5 g. of 25% by weight of isoprene in hexane solution and 0.7 mmoles of n-BuLi. The isoprene was polymerized for 3.5 hours in a water bath at 50° C. After formation of the first block, a second block was formed by a subsequent charge of 0.35 mmoles of a bistetrahydrofuryl propane randomizer, 56.0 g. of a 25% by weight of isoprene in hexane solution and 36.0 g. of 33% by weight of styrene in hexane solution. Polymerization was slightly exothermic and was conducted at 25° C. for approximately 16 hours (overnight) to produce an A-B diblock copolymer solution.

The A-B diblock solution was co-charged into a one gallon stainless steel reactor with 5.0 mmoles of n-BuLi and heated to 90° C. A blend of 1.5 lbs. of 33% by weight of styrene in hexane solution and 2.4 lbs. of 25% by weight of isoprene in hexane solution was metered into the reactor. A very low viscosity dispersion having 23.4% solid was prepared.

The recovered styrene-isoprene rubber possessed the following properties displayed in Table V.

TABLE V

| EXAMPLE NO. | 17 |
|---|---|
| Hnmr | |
| % styrene | 44.3 |
| Isoprene | |
| % - 1,4 | 79 |
| % - 1,2 | 16 |
| % - 3,4 | 5 |
| GPC | |
| $M_n$ | 124,400 |
| $M_w$ | 201,700 |
| $M_w/M_n$ | 1.62 |
| $T_g$ (°C.) | −15 |

While certain representative embodiments and details have been shown for the purpose of illustrating the invention, it will be apparent to those skilled in the art that various changes and modifications may be made therein without departing from the scope of the invention.

I claim:

1. A process for the dispersion copolymerization of 35 to 70% by weight of vinyl substituted aromatic monomer and 30 to 65% by weight of conjugated diene monomer comprising carrying out the copolymerization in a reaction mixture comprising a dispersing medium comprising at least 75 percent by weight of a liquid aliphatic hydrocarbon, an anionic catalyst system, and a block copolymer dispersing agent comprising at least two polymer blocks wherein at least one of the polymer blocks is soluble in the dispersing medium and at least another of the polymer blocks is insoluble in the dispersing medium and the dispersing agent acts to disperse a random copolymer of vinyl substituted aromatics and conjugated dienes formed in the presence of the dispersing agent and wherein the random copolymer has a solubility parameter of at least 1.9 greater than the solubility parameter of the dispersing medium.

2. The process of claim 1 in which the dispersing medium comprises at least 60 percent by weight of n-hexane.

3. The process of claim 1 in which the block copolymer dispersing agent comprises a soluble block of a polydiene or a copolymer formed by the copolymerization of conjugated diene monomers and vinyl substituted aromatic monomers and an insoluble block of a polyvinylaromatic polymer or a copolymer formed by copolymerization of conjugated diene monomers and vinyl substituted aromatic monomers.

4. The process of claim 3 in which the soluble block is a polymer or copolymer formed from 70 to 100 parts by weight of conjugated diene monomer contributed units and 0 to 30 parts by weight of vinyl substituted aromatic monomer contributed units and the insoluble block is a polymer or copolymer formed from 0 to 65 parts by weight of conjugated diene contributed units and 35 to 100 parts by weight of vinyl substituted aromatic monomer contributed units.

5. The process of claim 1 in which the block copolymer dispersing agent is a diblock polymer containing one block of polybutadiene and one block formed by the random copolymerization of 0 to 65 weight percent of butadiene and 35 to 100 weight percent of styrene.

6. The process of claim 1 in which the block copolymeric dispersing agent is a diblock polymer containing a first block formed by the random copolymerization of 70 to 100 weight percent of butadiene and 0 to 30 weight percent of styrene and a second block formed by the random copolymerization of 0 to 65 weight percent of butadiene and 35 to 100 weight percent of styrene.

7. The process of claim 1 in which the catalyst is a lithium based anionic initiator.

8. The process of claim 1 wherein the formed dispersion contains 10 to 50 weight percent of polymer solids.

9. The process of claim 1 wherein the dispersing agent comprises about 1.0 to about 20.0 weight percent of the monomers.

10. The process of claim 1 wherein the conjugated diene monomer is 1,3-butadiene or isoprene.

11. The process of claim 1 wherein the vinyl substituted aromatic monomer is styrene.

12. The process of claim 1 in which the weight ratio of the soluble polymer block of the dispersing agent to the insoluble polymer block ranges from 9.0/1.0 to about 1.0/9.0.

13. The process of claim 1 wherein the dispersing medium consists essentially of hydrocarbons having nine or less carbon atoms.

* * * * *